United States Patent
Aguilar et al.

(10) Patent No.: US 6,446,203 B1
(45) Date of Patent: Sep. 3, 2002

(54) METHOD AND SYSTEM FOR SELECTING FROM MULTIPLE BOOT CODE IMAGES TO BE LOADED IN A DATA PROCESSING SYSTEM

(75) Inventors: Maximino Aguilar; Norbert Blam, both of Austin; John William Gorrell, Jr., Round Rock; Yuan-Chang Lo, Austin; James Michael Stafford, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/317,552

(22) Filed: May 24, 1999

(51) Int. Cl.$^7$ ............................................... G06F 9/445
(52) U.S. Cl. ............................ 713/2; 713/100; 710/10; 711/170; 714/36
(58) Field of Search ............................ 713/1, 2, 3, 100; 709/222, 220, 221; 710/1, 10, 14, 104; 714/36, 3, 170

(56) References Cited

U.S. PATENT DOCUMENTS

| | | | |
|---|---|---|---|
| 5,418,918 A | * 5/1995 | Vander Kamp et al. | 395/375 |
| 5,854,905 A | * 12/1998 | Garney | 710/104 |
| 5,933,631 A | * 8/1999 | Mealey et al. | 713/2 |
| 5,948,101 A | * 9/1999 | David et al. | 713/2 |
| 6,098,158 A | * 8/2000 | Lay et al. | 711/162 |
| 6,167,532 A | * 12/2000 | Wiseup | 713/300 |
| 6,266,809 B1 | * 7/2001 | Craig et al. | 717/11 |
| 6,272,628 B1 | * 8/2001 | Aguilar et al. | 713/2 |
| 6,282,675 B1 | * 8/2001 | Sun et al. | 714/36 |

* cited by examiner

Primary Examiner—Jeffrey Gaffin
Assistant Examiner—Rijue Mai
(74) Attorney, Agent, or Firm—Joseph P. Lally; Mark E. McBurney; J. Bruce Schelkopf

(57) ABSTRACT

A computer system including a processor, a system memory, and a boot code storage device. The system memory is connected to the processor and is suitable for storing processor data and instructions. The boot code storage device includes an image selection indicator for indicating which of multiple boot code images are to be loaded. The computer system further includes means for initiating a boot sequence stored on the boot code storage device. The boot sequence selects from first and second boot images based upon the state of the image selection indicator and loads the selected image into the system memory in response to a boot event. In one embodiment, the image selection indicator is in an initial state until the boot code sequence successfully loads a boot image. The image selection indicator is set to a value indicative of the loaded image when one of the boot images is successfully loaded. The boot code storage sequence attempts, in the preferred embodiment, to load the previously load boot image when the system detects a setting of the image selection indicator indicative of a previously loaded boot image. In the preferred embodiment, the boot code sequence responds to a specified user input sequence by presenting the user with a configuration screen suitable for altering the value of the image selection indicator such that the user may later the boot image that will be loaded during a subsequent execution of the boot sequence. In one embodiment, the first boot image is a BIOS based boot image and the second image is a network based (non-BIOS) boot image. The boot code storage device is preferably a flash memory device.

21 Claims, 2 Drawing Sheets

METHOD AND SYSTEM FOR SELECTING FROM MULTIPLE BOOT CODE IMAGES TO BE LOADED IN A DATA PROCESSING SYSTEM

BACKGROUND

1. Field of the Present Invention

The present invention generally relates to the field of microprocessor based computer and more particularly to a method and system for booting a computer with one of multiple boot images.

2. History of Related Art

Computer systems generally require some manner of boot procedure to achieve a functional state after a system reset, a system wake up, or a power-on event. The boot procedure typically includes executing a boot sequence stored on a nonvolatile memory of the system. The boot sequence is responsible for loading a boot image into system memory. Historically, a computer system's boot device was suitable for loading only a single boot image. With a conventionally designed machine, an end user who wishes to load a different boot image than the boot image stored on the system's boot device is required to obtain an second boot or reprogram the existing boot device, thereby losing the original boot image in the process. Manufacturers of conventionally designed systems must stock multiple types of boot devices to meet the various needs of their customers. Customers requiring a first type of boot image will require a first boot device while customers requiring a second type of boot image will require a second boot device thereby creating potential manufacturing concerns including order tracking and inventory management for the manufacturer. Moreover, the differing requirements of various customers prevents the manufacturer from being able to build, stock, and sell a single machine that can meet the needs of all of its customers (assuming that, aside from the boot image, the different customers have the same computing requirements). In addition, the number of users who require the option of being able to boot from multiple boot images is increasing. Such users face currently face the formidable task of reprogramming or physically replacing the boot device in their systems each time they need to switch images. Accordingly, for a number of reasons, it is would be highly desirable to offer a system capable of easily switching between multiple boot images.

SUMMARY OF THE INVENTION

Broadly speaking the present invention contemplates a computer system and an accompanying boot code storage device. According to the invention, the computer system includes a processor, a system memory, and the boot code storage device. The system memory is connected to the processor and is suitable for storing processor data and instructions. The boot code storage device includes an image selection indicator for indicating which of multiple boot code images are to be loaded into the system memory. The computer system further includes means for initiating a boot sequence stored on the boot code storage device. The boot sequence selects from first and second boot images based upon the state of the image selection indicator and loads the selected image into the system memory in response to a boot event. In one embodiment, the image selection indicator is in an initial state until the boot code sequence successfully loads one of the boot images. The image selection indicator is set to a value indicative of the loaded image when one of the boot images is successfully loaded. The boot code storage sequence attempts, in the preferred embodiment, to load a previously loaded boot image when the system detects a setting of the image selection indicator indicative of a previously loaded boot image. In other words, the system has a preference to load a previously loaded boot image. In the preferred embodiment, the boot code sequence responds to a specified user input sequence by presenting the user with a configuration screen suitable for altering the value of the image selection indicator such that the user may alter the boot image that will be loaded during a subsequent execution of the boot sequence. In one embodiment, the first boot image is a BIOS based boot image and the second image is a network based (non-BIOS) boot image. The boot code storage device is preferably a flash memory device.

The invention still further contemplates a method of booting a computer system. A boot code sequence responsive to a boot event is initiated and the state of an image selection indicator determined. In response to detecting an initial state of the image selection indicator, an attempt is made to load, in sequential order, one of a set of boot images until one of the boot images loads successfully. When one of the boot images loads successfully, the image selection indicator is set to a value indicative of the successfully loaded image. In response to detecting a state of the image selection indicator indicative of a previously loaded boot image, the previously loaded boot image is loaded into system memory. The method further includes displaying a configuration screen suitable for altering the state of the image selection indicator when a specified user input sequence is detected during execution of the boot code sequence. The process of altering the state of the image selection indicator comprises, in one embodiment, programming a flash memory device on which the image selection indicator is located. The boot event may be comprised of a local boot event such as a resetting of the computer system or a network based boot event.

BRIEF DESCRIPTION OF THE DRAWINGS

Other objects and advantages of the invention will become apparent upon reading the following detailed description and upon reference to the accompanying drawings in which.

Figure 1:
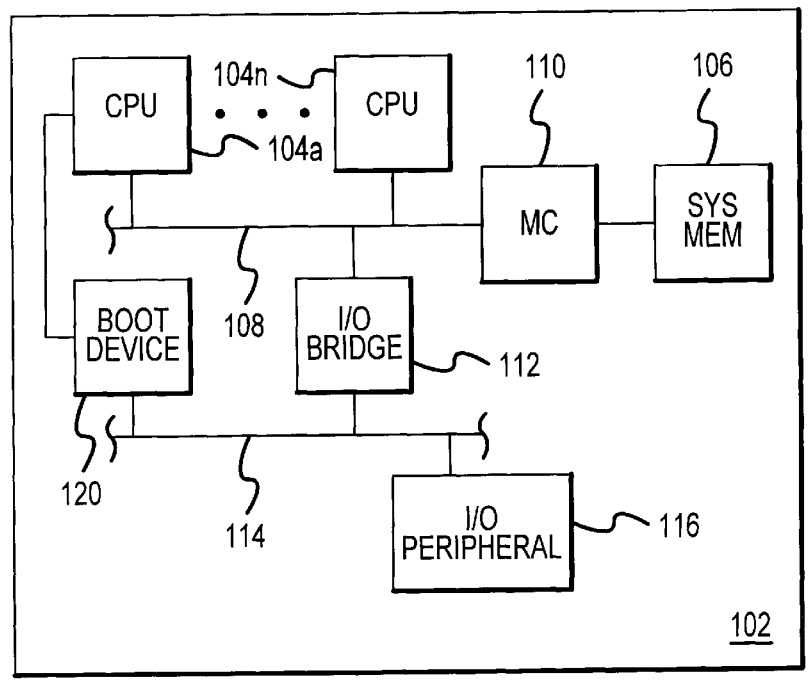
FIG. 1 is a simplified block diagram of a computer system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts a simplified block diagram of a computer system 100 according to the present invention. Computer system 100 includes one or more processing units or CPUs 104a through 104n (collectively referred to a processors 104). The set of processors 104 are connected via a system bus 108 to a memory controller 110 and a corresponding system memory 106. System memory 106 is preferably comprised of an array of dynamic RAMs and is suitable for storing processor data and instructions. An I/O bridge 112 is connected between system bus 108 and an I/O bus 114. I/O bus 114 is preferably adapted for receiving a variety of peripheral or I/O devices 116. I/O device 116 might comprise a network adapter or graphics adapter. In embodiments of computer system 100 designed for the network computing market, computer system 100 may be designed without a random access, permanent storage device such as a hard disk. In embodiments of computer system 100 that include a hard disk, the disk controller is preferably coupled to I/O bus 114. I/O bus 114 is preferably compliant with any of a variety of industry standard bus architectures such as the PCI, ISA, EISA, or MCA architectures familiar to those skilled in microprocessor based computer systems. Computer system 100 further includes a boot code storage device 120.

Boot code storage device 120, is preferably a non-volatile memory device suitable for storing code required to transition computer system 100 from a standby or off state to an operational state in which application or operating system programs can run. The boot code storage device includes a set of instructions that are executed immediately after the system is booted. The boot code is responsible for loading a boot image into system memory 106 of computer system 100 in response to a boot event. A boot image, for purposes of this disclosure refers to a system memory image that includes an operating system kernel as well as any file systems, libraries, and programs necessary to bring the computer to a functional state.

In one embodiment, boot code storage device is implemented with flash memory in a configuration commonly referred to as a flash card. The use of flash memory for boot code storage device 120 enables reprogramming of the boot code to include flash code updates and revisions. While flash memory provides a degree of flexibility by permitting boot code alteration without removing the boot code storage device, the reprogramming of a flash device requires dedicated software to produce the specific timing and voltage signals needed. Accordingly, altering the boot code storage device is less than trivial.

Systems such as computer system 100 are being used in an ever increasing variety of applications and environments. The manufacturer, seller, and possibly even the customer of the system may not know the precise application for which the system is intended at the time of sale. The boot code image that must be present for a running a particular application must be loaded by the boot code storage device during system boot. Because different applications and operation systems require different boot images, the boot code image stored on a boot code storage device must support the desired application. In conventionally designed systems, a change in boot code image to accommodate a change in operating system or application required a reprogramming or replacement of the boot code storage device.

Figure 2:
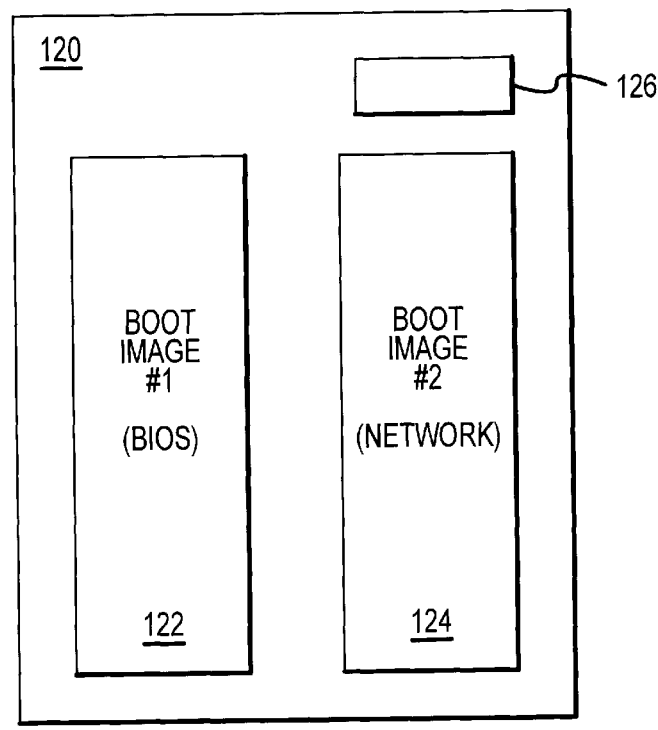
FIG. 2 is a conceptualized representation of a boot code storage device including dual boot images according to the present invention.

The present invention contemplates a boot code storage device capable of selecting a boot image from two or more boot images on the boot code storage device and storing the selected boot image to system memory 106. Turning to FIG. 2, the depicted embodiment of boot code storage device 120 according to the invention includes first and second boot code images 122 and 124 respectively as well as a boot image selection indicator 126. In response to a boot event such as powering on computer system 100, pushing a reset button on the system cabinet, or a network wake-up event, computer system 100 initiates a boot code sequence stored on boot code storage device 100. The boot code sequence determines the state of image selection indicator 126. In one embodiment, image selection indicator 126 is in an initial state when the computer system is powered on for the first time and remains in the initial state until one of the available boot images has been loaded successfully. When image selection indicator 126 is detected by the boot sequence as being in the initial state, the boot sequence will attempt to load each of the available boot images on boot codes storage device 120 until one of the boot images loads successfully. If the boot code sequence succeeds in loading one of the available boot images and computer system 100 achieves an operational state running under the loaded boot image, image selection indicator 126 is altered to indicate the boot image that was successful. Upon subsequent boot events, the boot code sequence will detect the altered state of image selection indicator 126 and proceed to load the boot image indicated by indicator 126. In this manner, once a particular boot image has been loaded successfully, the presumption is that the system will run using this boot image thereafter. Although the depicted embodiment indicates image selection indicator 126 as contained with boot code storage device 120, other embodiments may include non-volatile storage external to boot code storage device such as an external EPROM, an additional flash memory device, or a battery backed CMOS storage device in which image selection indicator 126 is stored.

The boot image presumption indicated by image selection indicator 126 may be altered by a user of computer system 100 when it is desirable to boot computer system 100 with a different boot image. In one embodiment, the user can alter the state of image selection indicator 126 through a "set-up" menu invoked by entering a specified keyboard or other input sequence during the boot time frame. Thus, a user who desires to boot computer system 100 with second boot image 124 on a system whose image selection indicator 126 indicates first boot image 122 as the default boot image may modify indicator 126 by booting computer system 100 and entering the appropriate keyboard sequence while the boot sequence is executing. Computer system 100 will respond to the input sequence by presenting the user with a configuration screen via a display terminal (not depicted). The configuration menu will include an entry for image selection indicator 126 and facilities for modifying the value or setting of indicator 126 and for re-executing the boot code sequence with the new value of indicator 126.

Boot code storage device 120, as depicted in FIG. 2, includes first and second boot images 122 and 124 respectively. In one embodiment of the invention first boot 122 is a BIOS based boot image and second boot image 124 is a non-BIOS boot image referred for purposes of this disclosure as a network-based boot image. BIOS based boot images and operating systems are well known in the field of personal computers. The BIOS provides micro code at the lowest level that controls the I/O device hardware of system 100 such as disk drives. Detailed BIOS information may be found in Croucher, *Que's BIOS Companion* (MacMillan 1998), incorporated by reference herein. The network based boot image contemplated herein is suitable for using with loading an operating system such as JavaOS. Network based boot images and operating systems as contemplated herein are relatively small (compared to BIOS based boot images and operating systems) platform independent operating systems adapted to execute applications directly on hardware platforms without requiring any other host operating system.

In one embodiment, network based boot image 124 is recognizable by its executable and linking format (ELF) compliant header section. Network based boot images and operating systems are specifically designed to support distributed processing across a variety of products in a multi-platform, thin-client environment.

Figure 3:
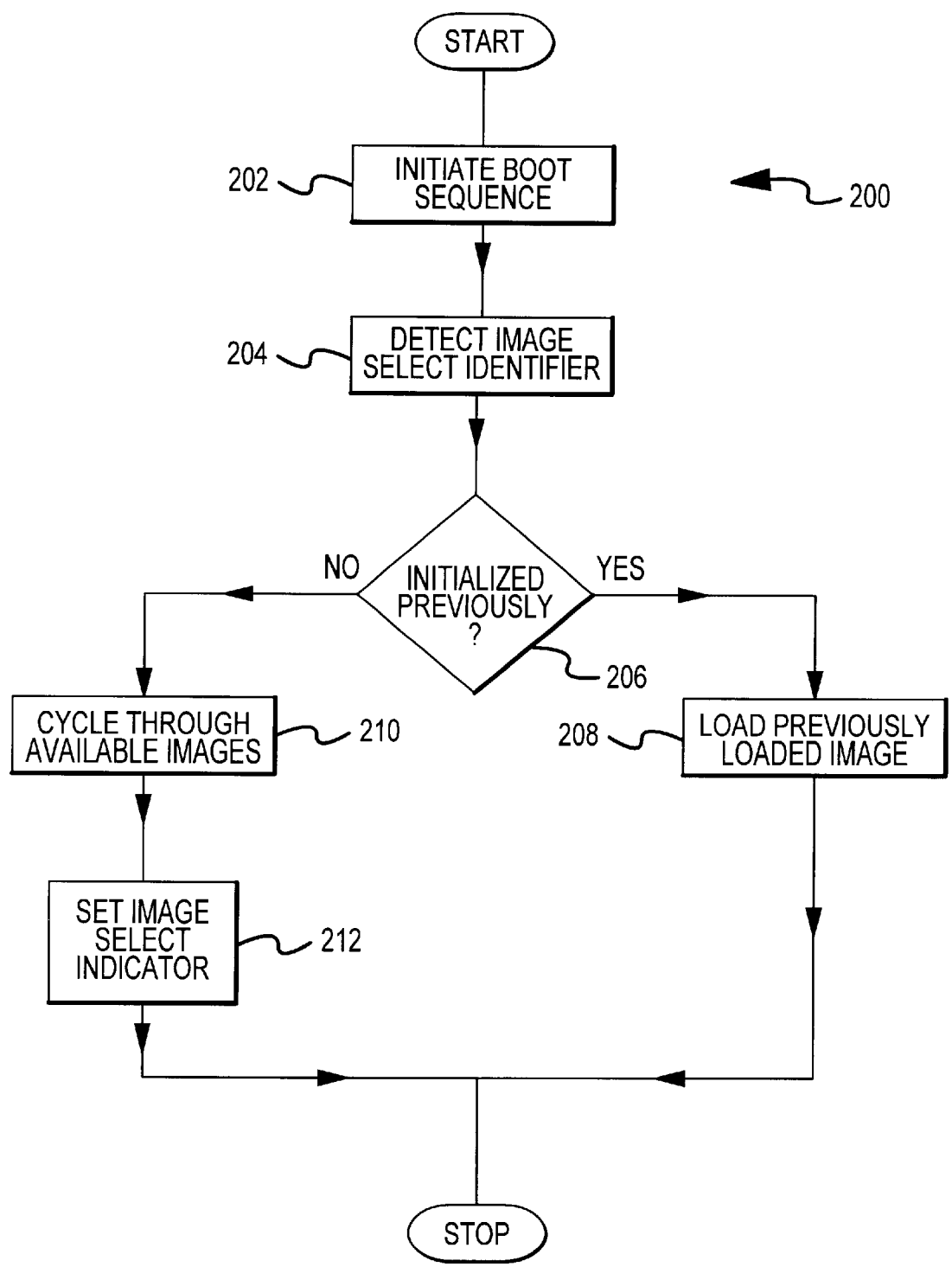
FIG. 3 is a flow diagram of a method of booting a computer system according to the present invention.

FIG. 3 depicts a flow diagram of a method 200 of booting computer system 100 according to the present invention. A boot code sequence is initiated in step 202 such as by resetting or powering on computer system 100 or by sending a network wake-up event to computer system 100 via a network (not shown) of which computer system 100 is a part. The boot code sequence determines the state or value of image selection indicator 126 in step 204. Based upon the value of image selection identifier 126 in step 204, a decision is made in step 206. If image selection indicator 126 is in an initial state, the boot code sequence assumes that computer system 100 has not previously successfully loaded any boot image into its system memory. If, one the other hand, image selection indicator is set to a value associated with one of the boot images stored in boot code storage device 120, then the boot code sequence will assume that the indicated boot image was previously loaded and that the user wishes to load the same boot image that was previously loaded. Accordingly, method 200 according to the embodiment depicted in FIG. 3 includes a step 210, executed in response to determining the image selection indicator 126 was in an initial state, in which the boot code sequence cycles through each of the available boot images until one of the boot images is successfully loaded. The order in which the available boot images are tried is implementation specific and the invention is not intended to require any particular ordering or prioritization of the available boot images. In step 212, image selection indicator 126 is set if one of the boot images loads successfully. Method 200 further includes step 208, initiated in response to determining that image selection indicator 126 was set during a previous execution of the boot code storage sequence, in which the boot code storage sequence attempts to reload the boot image indicated by the value of image selection indicator 126. Not shown in the flow diagram of FIG. 3 is the ability to interrupt the boot code sequence with an appropriate input sequence to change the value or state of image selection indicator 126. In one embodiment of method 200 the available boot images include a BIOS based boot image and a network based boot image.

It will be apparent to those skilled in the art having the benefit of this disclosure that the present invention contemplates a boot code storage device configured with multiple boot images and a computer system for use therewith. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer system comprising:

a processor;

a system memory connected to the processor and suitable for storing processor data and instructions;

a boot code storage device including an image selection indicator; and means for initiating a boot sequence stored on the boot code storage device, wherein the boot sequence selects from first and second boot images based upon the state of the image selection indicator and loads the selected image into the system memory in response to a boot event, wherein the first boot image comprises a BIOS boot image suitable for use with BIOS-based operating systems and wherein the second boot image comprises a network boot image suitable for use with a network operating system.

2. The computer system of claim 1, wherein the first and second boot code images are stored on the boot code storage device.

3. The computer system of claim 1, wherein the image selection indicator is in an initial state until the boot code sequence successfully loads a boot image.

4. The computer system of claim 1, wherein, in response to successfully loading one of the boot images, the image selection indicator is set a value indicative of the loaded image.

5. The computer system of claim 1, wherein, in response to detecting a setting of the image selection indicator indicative of a previously loaded boot image, the boot code storage sequence attempts to load the previously load boot image.

6. The computer system of claim 1, wherein the boot code sequence responds to a specified user input sequence by presenting the user with a configuration screen suitable for altering the value of the image selection indicator.

7. The computer system of claim 1, wherein the second boot image includes an Executable and Linking Format (ELF) compliant header section.

8. The computer system of claim 7, wherein the second boot image comprises a JavaOS boot image.

9. A boot code storage device for use with a computer system, wherein the boot code storage device is configured with first and second boot code images and an image selection indicator, and further configured with a boot code storage sequence that selects the first or second boot code images, responsive to the value of the image selection indicator, and loads the selected image into a system memory of a computer system, wherein the first boot code image comprises a BIOS-based boot image suitable for use with a BIOS-based operating system and the second boot code image comprises a network boot image suitable for use with a network operating system.

10. The storage device of claim 9, wherein the boot code storage device comprises a flash memory device.

11. The storage device of claim 9, wherein the image selection indicator is in an initial state until the boot code sequence successfully loads either the first or second boot image.

12. The storage device of claim 9, wherein, in response to successfully loading one of the boot images, the boot code sequence sets the image selection indicator to a value indicative of the loaded image.

13. The storage device of claim 9, wherein, in response to detecting a setting of the image selection indicator indicative of a previously loaded boot image, the boot code storage sequence attempts to load the previously load boot image.

14. The storage device of claim 9, wherein the boot code sequence responds to a specified user input sequence by presenting the user with a configuration screen suitable for altering the value of the image selection indicator.

15. The storage device of claim 9, wherein the second boot image includes an Executable and Linking Format (ELF) compliant header section.

16. The storage device of claim 15, wherein the second boot image comprises a JavaOS boot image.

17. A method of booting a computer system, comprising:

initiating a boot code sequence responsive to a boot event and determining the state of an image selection indicator;

responsive to detecting an initial state of the image selection indicator, attempting in sequential order, to load one of a set of boot images until one of the boot images loads successfully and setting the image selection indicator to a value indicative of the successfully loaded boot image, wherein at least one of the set of boot images is a BIOS-based boot image and at least one of the set of boot images is a network-based boot image; and responsive to detecting a state of the image selection indicator indicative of a previously loaded boot image, loading the previously loaded boot image into system memory.

18. The method of claim 17, further comprising, responsive to a user input sequence during execution of the boot code sequence, displaying a configuration screen suitable for altering the state of the image selection indicator.

19. The method of claim 17, wherein altering the state of the image selection indicator comprises programming a flash memory device on which the image selection indicator is located.

20. The method of claim 17, wherein boot event the comprises a network wake-up event.

21. The method of claim 17, wherein the set of boot images includes a BIOS based boot image and a network based boot image.

* * * * *